United States Patent

Taruishi

[11] Patent Number: 5,841,656
[45] Date of Patent: Nov. 24, 1998

[54] PROGRAMMING SYSTEM FOR SEQUENCE CONTROL AND CONTROL UNIT FOR EXECUTING PROGRAM FOR SEQUENCE CONTROL

[75] Inventor: Hajime Taruishi, Saitama-ken, Japan

[73] Assignee: Kabushiki Kaisha Toshiba, Kawasaki, Japan

[21] Appl. No.: 709,599

[22] Filed: Sep. 9, 1996

[30] Foreign Application Priority Data

Sep. 7, 1995 [JP] Japan ................................... 7-230320

[51] Int. Cl.[6] ................................................... G05B 19/42
[52] U.S. Cl. ......................... 364/191; 364/141; 364/147
[58] Field of Search ................................... 364/140, 141, 364/147, 191

[56] References Cited

U.S. PATENT DOCUMENTS 5,644,487  7/1997  Duff et al. ............................... 364/140

FOREIGN PATENT DOCUMENTS

WO 91/06050  5/1991  WIPO .
WO 95/15523  6/1995  WIPO .
WO 95/23374  8/1995  WIPO .

OTHER PUBLICATIONS

International Standard IEC 1131–3, First Edition, Chapter 3, Sec b, Sequential Function Chart (SFC) elements; Mar. 1993, pp. 151, 153, 155, 157, 159, 161.

International Society for Measurement and Control, ISA–ds88.02 WG1, Chapter 6, Static Aspect (Symbols); May 13, 1996, pp. 11–20.

Primary Examiner—Reba I. Elmore
Assistant Examiner—Sheela S. Rao
Attorney, Agent, or Firm—Oblon, Spivak, McClelland, Maier & Neustadt, P.C.

[57] ABSTRACT

A programming system for sequence control including a display, a functional symbol definition memory for storing functional symbols, each for defining one of steps in a sequence showing control procedure for a control object, respectively, a sequential diagram generating and display unit including a sequence table, and an input device for inputting in order the functional symbols along with process contents to be executed in the functional symbols, respectively, into the sequential diagram generating and display unit, which displays the functional symbols along with the process contents as a sequential diagram on a program generating screen of the display and stores the process for each of the steps in the sequence table. The programming system for sequence control further includes an execution program generating unit for generating an execution program that is executable by the control unit for the sequential diagram based on the memory contents of the functional symbol definition memory and the sequence table, an execution program transfer unit for transferring the execution program to the control unit, a sequential diagram reverse generating unit for reversely generating the sequential diagram from the execution program and a reversely generated sequential diagram display unit for displaying the sequential diagram on the program generating screen.

12 Claims, 16 Drawing Sheets

Fig. 3A

| | SYMBOL | NAME | FUNCTION |
|---|---|---|---|
| 1 | START | OPERATION START (abbrev.: OPS) | DECLARES THE TASK (OPERATION) START POSITION. |
| 2 | END | OPERATION END (abbrev.: OPE) | DECLARES THE TASK (OPERATION) END POSITION. |
| 3 | # S** ****** | PHASE (abbrev.: PHS) | EXECUTES THE PROCESS (PHASE). |
| 4 | # S** ****** | PHASE SUBROUTINE (abbrev.: PHR) | EXECUTES THE PROCESS (PHASE) DEFINED AS THE SUBROUTINE. |

| SYMBOL | NAME | FUNCTION |
|---|---|---|
| 5 | ![START] | PHASE START (abbrev.: PHS) | DECLARES THE PROCESS (PHASE) START POSITION. |
| 6 | ![END] | PHASE END (abbrev.: PHE) | DECLARES THE PROCESS (PHASE) END POSITION. |
| 7 | # S** ↑ ⎯⎯⎯ ...... | CONDITION (abbrev.: CND) | PROCEEDS TO THE SUBORDINATE STEP AS THE CONDITION DEFINED IN THE SCRIPT IS REALIZED. WHEN NOT REALIZED, IF THERE IS THE CONNECTION SHOWN AT THE UPPER RIGHT, PROCEEDS TO THAT DIRECTION. |
| 8 | MONITORING TIME SET VALUE *S # S ⎯⎯⎯ ...... | TIMER CONDITION (abbrev.: TCD) | WHEN THE SCRIPT DEFINES NO CONDITION, STOPS FOR A CONTINUING TIME SET VALUE. IF THERE IS A CONDITION DEFINED, CONTINUOUSLY PROCEEDS FOR A SET TIME FOR THE CONDITION REALIZED. |
| 9 | MONITORING TIME SET VALUE *S # S ⎯⎯⎯ ...... | ANSWER CONDITION (abbrev.: ACD) | IF THE CONDITION DEFINED IN THE SCRIPT IS NOT REALIZED WITHIN THE SET TIME, GENERATES THE ANSWER BACK ALARM AS THE OPERATION AND EXECUTES THE OPERATION WHEN ABNORMAL DEFINED IN THE SCRIPT AND IF THERE IS THE CONNECTION SHOWN AT THE UPPER RIGHT, PROCEEDS TO THAT DIRECTION. |

Fig. 3B

| | SYMBOL | NAME | FUNCTION |
|---|---|---|---|
| 10 | # S** [······] | ACTION (abbrev.: ACT) | EXECUTES THE CALCULATION AND INSTRUCTIONS DEFINED IN THE SCRIPT AND PROCEEDS TO THE NEXT STEP. |
| 11 | # S** [······]***S  (MONITORING TIME SET VALUE) | ACTION & ANSWER (abbrev.: ACA) | FIRST, EXECUTES THE CALCULATING OPERATION DEFINED IN THE SCRIPT. THEN, IF THE ANSWER DEFINED IN THE SCRIPT IS OBTAINED WITHIN THE SET TIME, PROCEEDS TO THE DIRECTLY UNDER STEP. IF NO ANSWER IS OBTAINED, GENERATING THE ANSWER BACK ALARM, EXECUTES THE OPERATION WHEN ABNORMAL DEFINED IN THE SCRIPT AND IF THERE IS THE CONNECTION SHOWN AT THE UPPER RIGHT, PROCEEDS IN THAT DIRECTION. |
| 12 | # S** ⟨PAGE - STEP⟩ | JUMP (abbrev.: JMP) | JUMPS TO THE STEP DESIGNATED BY PAGE NO. AND STEP NO. |
| 13 | # S** [▬▬▬] | LOGIC SEQUENCE (abbrev.: IBD) | EXECUTES THE LOGIC SEQUENCE (LGD) DEFINED IN ANOTHER PAGE. |

Fig. 4

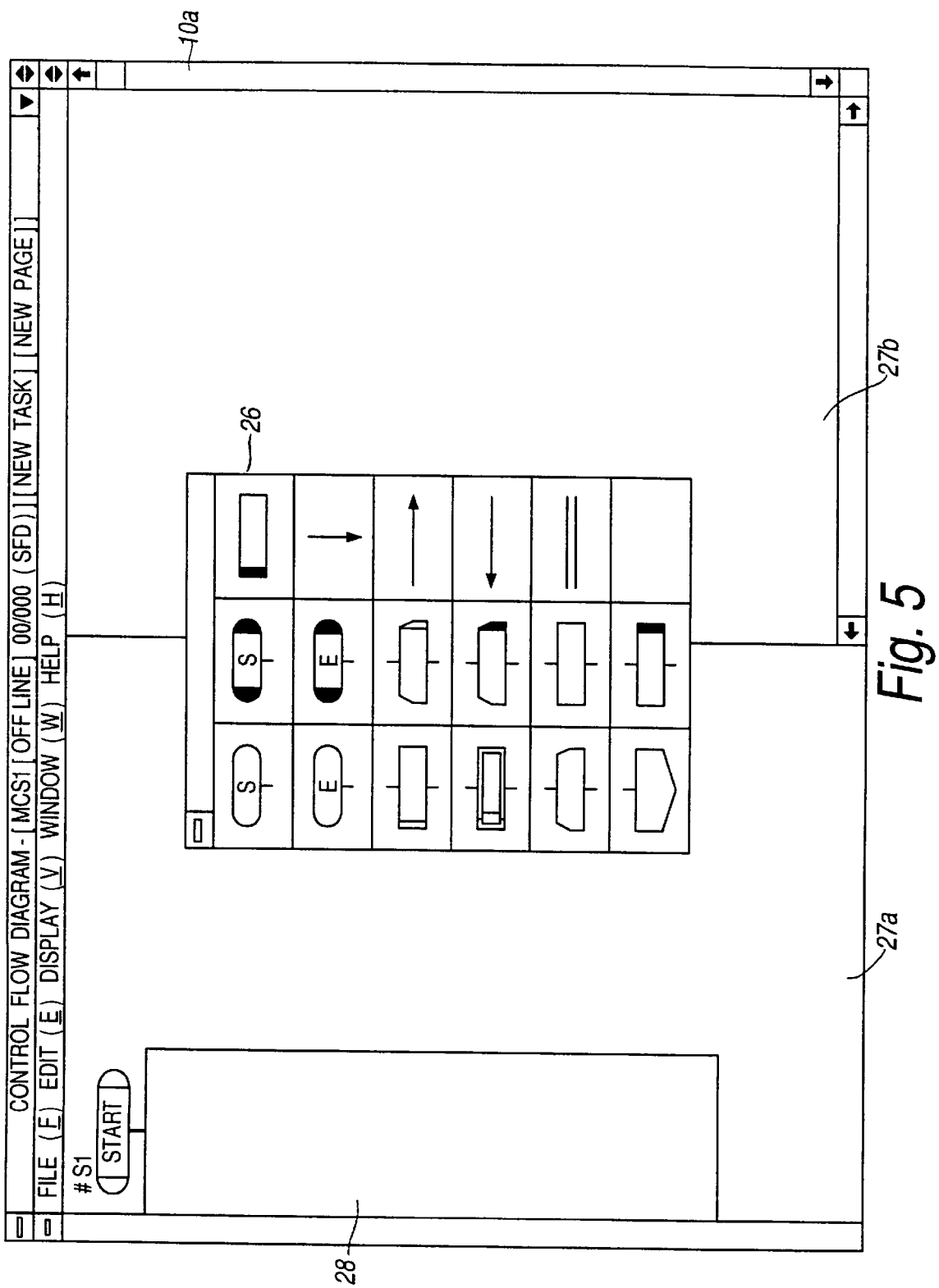

PROGRAMMING SYSTEM FOR SEQUENCE CONTROL AND CONTROL UNIT FOR EXECUTING PROGRAM FOR SEQUENCE CONTROL

BACKGROUND OF THE INVENTION

1. Field of the Invention

This invention relates to a programming system for sequence control and a control unit for executing the program for sequence control. More particularly, this invention relates to a programming system for sequence control to generate a program for sequence control used in a control unit to control plants, etc., in various process control systems and the control unit for executing the program for sequence control. This invention further relates to a process control system including a programming system for sequence control and a control unit for sequence control, a program execution method for executing a program for sequence control, a programming tool for sequence control, a programming method for sequence control, and a program storing medium for sequence control.

2. Description of the Related Art

In recent years, a graphically expressed language simulating a flowchart-like expression has been principally used as a programming language in light of the need to clearly define conditions and operations as a control process progresses. That is, the graphically expressed language is used when programming a program that is incorporated in control units in process control systems to monitor and control the operation of various plants (e.g., factories, a digital control system (DCS) and a programmable logic controller (PLC)) to, control the operations of controlled objects such as actual equipment.

Next, a programming procedure using the graphically expressed language described above will be explained while referring to FIG. 13 through FIG. 18.

First, a programmer generates a sequential diagram showing the control procedure for a controlled object on a notebook or in drawings. A sequential diagram shown in FIG. 13 is equivalent to a specification relating to the control of a controlled object.

Specifically, process steps are named for each physically meaningful sequential process unit, for instance, "Initialization", "Standby", "Solvent Dosing", "C Chemical Dosing", "F Agent Dosing", "Aging", etc., and the process steps are shown like a flowchart by assigning a Step No. to each process. Further, the process steps 4, 5 and 6 that are connected by double lines in the diagram denote that they are executed in parallel.

The sequential diagram shown in FIG. 13 is a basic sequential diagram showing the entire control operation, and a more detailed sequential diagram is needed for each of process steps 1–8.

FIG. 14 is a detailed sequential diagram relating to Step No. 5 "F Agent Dosing" in the basic sequential diagram shown in FIG. 13. As illustrated here, each step is expressed by an operating symbol shown in a rectangle or a conditional symbol shown in a diamond shape, and definite numerical values and conditions for operating symbols and conditional symbols are described.

When completing the sequential diagram generating work, the programmer generates a flowchart type program or a sequential flowchart (SFC) type program on, for instance, a program generating screen of a programming system for sequence control referring to the generated sequential diagram.

FIG. 15 is a diagram showing one example of a flowchart type program generated by the programmer on the program generating screen. Specifically, it is a flowchart type program corresponding to the detailed sequential diagram relating to Step No. 5 "F Agent Dosing" shown in FIG. 14.

As illustrated here, in this flowchart type program, the process steps are expressed basically by two kinds of functional symbols of the operational symbols shown in a rectangle and conditional (branch) symbols shown in a diamond shape likewise the detailed sequential diagram shown in FIG. 14.

FIG. 16 is a diagram showing one example of a sequential flowchart (SFC) type program generated on the program generating screen by the programmer.

As is well known, this SFC type program is regulated in the IEC standard, featuring that the progress status of the sequential diagram shown in FIG. 13 is visualized. When using this SFC program, the flow of sequential processes (Steps S1–S8) is mainly defined by a sequential flowchart. Further, CS1–CS7 in the SFC type program shown in FIG. 16 are conditions for executing Steps S2–S8.

Detailed conditions CS1–CS6, CS8 and operations of Steps S1–S8 are described using, for instance, a ladder diagram (LD) as shown in FIG. 17.

Further, the process of monitoring abnormalities or when abnormal conditions have taken place is described separately using another ladder diagram (LD) as shown in FIG. 18.

However, even in the technique used to generate a control program using the flowchart type program shown in FIG. 15 or the SFC type programs shown in FIG. 16–FIG. 18, there were still such problems as shown below.

That is, in order to generate such program as shown in FIGS. 15–18 that are to be incorporated in control units such as DCS and PLC, etc., that are incorporated in process control systems, each process control system requires sequential diagrams (e.g., as shown in FIGS. 13 and 14) having several tens to several thousands of sheets.

In addition, in medium and large scale systems, program corrections to modify the behavior of controlled objects are to be repeatedly conducted after a system addition, modification, etc., even after a system has been constructed.

Accordingly, in a programmer controlled programming system to generating a program for sequence control, a program must be easily and rapidly generated and a generated program must have a uniform quality not influenced by the ability of a programmer. Furthermore, the program specification is of high describability and readability so that the contents and operations are easily understood and corrected by third persons.

(1) In a flowchart type program shown above, sequential progress is defined only by two kinds of symbols, that is, operational and, conditional symbols as described above, and therefore, it is necessary to describe both abnormal conditions of a process and the normal conditions using two kinds of symbols.

Because of this, in the original sequential diagram shown in FIG. 13, the control flow in the normal operation is clearly shown in Step Numbers 1–8. But, in FIG. 15 it is buried in the abnormal control flow so that the describability and readability of program specification drops remarkably when compared with the original sequential diagram.

Therefore, in the flowchart type program, there is some fear that the control operation in the normal operation may be extremely hard to understand for third persons who are not the programmer of this program.

(2) On the contrary, in the SFC type program, the control operations in the normal operation are described in Step Nos. S1–S8 as shown in FIG. 16 and the entire operation is easy to understand.

However, in this SFC type program, only one step is executed in one execution cycle of the control unit according to the definition of the SFC type program. Therefore, skill is required to rewrite the description that is suited to a SFC type program from the original sequential diagram by keeping the movement of the SFC type program in mind.

(3) Further, there are always repeated steps composed of a combination of conditions (CS)/operations (S) in the SFC type program as shown in FIG. 16. Accordingly, if conditional branches are to be repeated, it is necessary to include a dummy step, such as step S1 in FIG. 16. Thus, for the portion of the process in which conditional branches are repeated, one process in the sequential diagram shown in FIG. 14 may not be processed in one execution cycle in the program execution process in the control unit. As a result, the operation may not be executed faithfully corresponding to the control specification.

(4) Further, for a programmer of process control systems, in both a flowchart type program and a SFC type program, the dual management system regarding the sequential diagrams shown in FIGS. 13 and 14 (i.e., the "Specification") and a flowchart type program or SFC type program as (i.e., the "Program" shown in FIGS. 15–18 are still required.

Therefore, if the "Specification" is changed frequently, it becomes necessary to accurately modify the "Program" corresponding to the changed portion, accordingly. If any disagreement is produced between the specification and the program, poor control will result. In this case, it is necessary to perform complicated control to suspend subsequent modifications, read the entire program again, and detect and modify a point of disagreement manually. Thus, much labor and time are required for the specification change.

That is, in a programming technique in a "Specification" and a "Program" are separated, a basic problem requiring the dual management of both the "Specification" and the "Program" will never be solved.

SUMMARY OF THE INVENTION

Accordingly, one object of this invention is to provide a programming system for sequence control, a process control system, a programming tool for sequence control, a programming method for sequence control, and a program storing medium for sequence control which can input a sequential diagram corresponding to a specification almost as it is, generate an execution program executable by a control unit from the inputted sequential diagram automatically, and transfer the execution program to the control unit.

Another object of this invention is to provide a programming system for sequence control, a process control system, a programming tool for sequence control, a programming method for sequence control and a program storing medium for sequence control which can manage both a specification and an execution program executable by a control unit consolidatedly.

Still another object of this invention is to provide a programming system for sequence control, a process control system, a programming tool for sequence control, a programming method for sequence control and a program storing medium for sequence control which can generate an execution program executable by a control unit with high describability and readability for a program specification.

A further object of this invention is to provide a programming system for sequence control, a process control system, a programming tool for sequence control, a programming method for sequence control and a program storing medium for sequence control which can increase the working efficiency of generating an execution program executable by a control unit.

Still another object of this invention is to provide a programming system for sequence control, a process control system, a programming tool for sequence control, a programming method for sequence control and a program storing medium for sequence control which can sharply reduce the work for changing an execution program executable by a control unit associated with the specification change and increase the working efficiency of changing the execution program.

Still a further object of this invention is to provide a programming system for sequence control, a process control system, a programming tool for sequence control, a programming method for sequence control and a program storing medium for sequence control which can display the execution status in a control unit of an execution program executable by the control unit.

Another object of this invention is to provide a process control system and a control unit which can execute an execution program executable by the control unit and transfer the execution status of the execution program in the control unit to the programming system for display and monitoring.

Still another object of this invention is to provide a program execution method which can execute the ordered processing steps whos conditions are true in the progressing direction of a sequential diagram within one execution cycle even when a. plurality of conditional branches are continued in a sequential diagram, and can thereby operate faithfully based on a specification described in a sequential diagram.

These and other objects of this invention can be achieved by providing a programming system for sequence control, including a display unit, a functional symbol definition memory unit for storing a plurality of different kinds of functional symbols, each for defining one of a plurality of steps in a sequence showing a control procedure for a controlled object controlled by a control unit, respectively, a sequential diagram generating and display unit including sequence table unit, and an input unit for inputting, in order, a plurality of the functional symbols along with process contents in a text style to be executed in the functional symbols, respectively, into the sequential diagram generating and display unit. The sequential diagram generating and display unit displays a plurality of the functional symbols along with the process contents inputted by the input unit as a sequential diagram on a program generating screen of the display unit and stores a plurality of the process contents inputted by the input unit for each of the steps in the sequence table unit. The programming system for sequence control further includes an execution program generating unit for generating an execution program that is executable by the control unit for the sequential diagram based on the memory contents of the functional symbol definition memory unit and the sequence table unit, an execution program transfer unit for transferring the execution program to the control unit, a sequential diagram reverse generating unit for reversely generating the sequential diagram from the execution program, and a reversely generated sequential diagram display unit for displaying the sequential diagram generated by the sequential diagram reverse generating unit on the program generating screen.

According to one aspect of this invention, there is provided a control unit for controlling a controlled object, including an execution program receiving unit for receiving an execution program transferred from the programming system for sequence control to control the controlled object, an execution program execution unit for executing the execution program to control the controlled object, and an execution program execution status transfer unit for detecting an execution status of the execution program of the control object and for transferring the execution status of the execution program to the programming system for sequence control.

According to another aspect of this invention, there is provided a process control system, including a programming system for sequence control for generating an execution program to control a control object and a controlled unit for controlling the control object by the execution program. The programming system for sequence control includes, a display unit, a functional symbol definition memory unit for storing a plurality of different kinds of functional symbols, each for defining one of a plurality of steps in a sequence showing a control procedure for the controlled object controlled by the control unit, respectively, a sequential diagram generating and display unit including sequence table unit, and an input unit for inputting, in order, a plurality of the functional symbols along with process contents in a text style to be executed in the functional symbols, respectively, into the sequential diagram generating and display unit. The sequential diagram generating and display unit displays a plurality of the functional symbols along with the process contents inputted by the input unit as a sequential diagram on a program generating screen of the display unit and stores a plurality of the process contents inputted by the input unit for each of the steps in the sequence table unit. The programming system for sequence control further includes an execution program generating unit for generating an execution program that is executable by the control unit for the sequential diagram based on the memory contents of the functional symbol definition memory unit and the sequence table unit, an execution program transfer unit for transferring the execution program to the control unit, a sequential diagram reverse generating unit for reversely generating the sequential diagram from the execution program, and a reversely generated sequential diagram display unit for displaying the sequential diagram generated by the sequential diagram reverse generating unit on the program generating screen. The control unit for controlling the controlled object includes an execution program receiving unit for receiving the execution program transferred from the programming system to controlled the control object, an execution program execution unit for executing the execution program to control the controlled object, and an execution program execution status transfer unit for detecting an execution status of the execution program of the control object and for transferring the execution status of the execution program to the programming system. The programming system for sequence control further includes an execution program execution status receiving unit for receiving from the control unit the execution status of the execution program in the control unit, and an execution program execution status display unit for displaying the execution status of the execution program from the execution program execution status receiving unit on the sequential diagram corresponding to the execution program displayed on the program generating screen.

According to still another aspect of this invention, there is provided a program execution method for executing the execution program in the control unit, wherein a plurality of the steps in which progress conditions are true simultaneously are executed in one execution cycle by the control unit.

According to a further aspect of this invention, there is provided a programming tool for sequence control, including a functional symbol definition memory unit for storing a plurality of kinds of functional symbols, each for defining one of a plurality of steps in a sequence showing control procedure for a control object controlled by a control unit, respectively, and a sequential diagram generating and display unit including a sequence table unit. The sequential diagram generating and display unit displays a plurality of the functional symbols along with the process contents in a text style to be executed in the functional symbols, respectively, inputted in order by input unit as a sequential diagram on a program generating screen of display unit and stores a plurality of the process contents inputted by the input unit for each of the steps in the sequence table unit. The programming system for sequence control further includes an execution program generating unit for generating an execution program that is executable by the control unit for the sequential diagram based on the memory contents of the functional symbol definition memory unit and the sequence table unit, an execution program transfer unit for transferring the execution program to the control unit, a sequential diagram reverse generating unit for reversely generating the sequential diagram from the execution program, and a reversely generated sequential diagram display unit for displaying the sequential diagram generated by the sequential diagram reverse generating unit on the program generating screen.

According to another aspect of this invention, there is provided a programming method for sequence control including, storing a plurality kinds of functional symbols in a functional symbol definition memory, each for defining one of a plurality of steps in a sequence showing a control procedure for a controlled object controlled by a control unit, respectively, inputting in order a plurality of the functional symbols along with process contents in a text style to be executed in the functional symbols, respectively, displaying a plurality of the functional symbols along with the process contents inputted as a sequential diagram on a program generating screen, storing a plurality of the process contents inputted for each of the steps in a sequence table, generating an execution program that is executable by the control unit for the sequential diagram based on the memory contents of the functional symbol definition memory and the sequence table, transferring the execution program to the control unit, reversely generating the sequential diagram from the execution program, and displaying the sequential diagram reversely generated on the program generating screen.

According to a still further aspect of this invention, there is provided a program storing medium readable by a computer, tangibly embodying a program of instructions executable by the computer to perform method steps for sequence control. The method steps include storing a plurality kinds of functional symbols in a functional symbol definition memory, each for defining one of a plurality of steps in a sequence showing a control procedure for a controlled object controlled by a control unit, respectively, inputting in order a plurality of the functional symbols along with process contents in a text style to be executed in the functional symbols, respectively, displaying a plurality of the functional symbols along with the process contents inputted as a sequential diagram on a program generating screen, storing a plurality of the process contents inputted for each of the steps in a sequence table, generating an execution program that is executable by the control unit for the sequential diagram based on the memory contents of the functional symbol definition memory and the sequence table, transferring the execution program to the control unit, reversely generating the sequential diagram from the execution program, and displaying the sequential diagram reversely generated on the program generating screen.

In the programming system for sequence control, the process control system, the programming tool for sequence control, the programming method for sequence control and the program storing medium for sequence control in the construction described above, plural kinds of functional symbols defining sequential steps showing a control procedure of a controlled object and their functions are stored in the functional symbol definition memory. If functional symbols and the process contents in respective functional symbols are designated in a text format via the input device, functional symbols showing the flow of the normal sequence are displayed on the program generating screen by the sequence diagram generating and displaying unit.

Further, the connecting relation between functional symbols arranged on the program generating screen is automatically defined. Then the process contents composed of conditions and abnormality process, etc. are defined for each of these arranged functional symbols on the sequence table in the text format. This connecting relation has a directivity and the flow of execution of the sequence in the normal time is shown in many cases.

Then, this sequential diagram generated on the program generating screen is stored, and it is automatically converted into an execution program making one program generating screen as one unit by the execution program generating unit. The generated execution program is transferred to the control unit by the execution program transfer unit.

Further, the generated execution program is converted automatically to the original sequential diagram for one unit of one program generating screen by the sequential diagram reverse generating unit.

In addition, when the control unit is executing the execution program transferred by the programming system, the execution status of the applicable execution program transferred from the control unit is received and its execution status is displayed on the corresponding sequential diagram. As a result, it becomes possible to easily grasp the execution status of the applicable execution program.

That is, for a programmer it seems that a sequential diagram, which is a specification, is executed as it is, without impairing its describability and readability. When the specification is changed, it is only required to change a sequential diagram and conditions displayed on the program generating screen, and it is not necessary to perform the generation/change work of a program itself in a conventional technique. Accordingly, it is possible to achieve a high productivity and serviceability as the programming system, the process control system, the program for sequence control generating product, and the method for generating a program for sequence control.

Further, in the control unit and process control system of the present invention, when the execution program in a unit of the program generating screen is received from the programming system, the received execution program is executed by the execution program executing unit. Further, the execution status of the execution program is transferred to the programming system. Therefore, a programmer is able to grasp the program execution status on the program generating screen of the programming system.

Further, in the program execution method of the present invention, the route where conditions are true in the progressing direction of a sequential diagram is executed in one execution cycle. As a result, even when there is a description of a sequential diagram where plural conditional branches continue, no process extends over plural execution cycles like a conventional SFC type program. Therefore, the operation faithfully corresponding to a specification described in a sequential diagram is achieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3a and 3b are combined to be a diagram showing one part of the contents of a functional symbol definition memory in the programming system according to an embodiment of this invention;

FIG. 4 is a diagram showing the other part of the contents of the functional symbol definition memory in the programming system according to an embodiment of this invention;

FIG. 5 is a diagram showing the functional symbols displayed on a program generating screen of the programming system according to an embodiment of this invention;

DETAILED DESCRIPTION OF THE PREFERRED EMBODIMENTS

Figure 1:
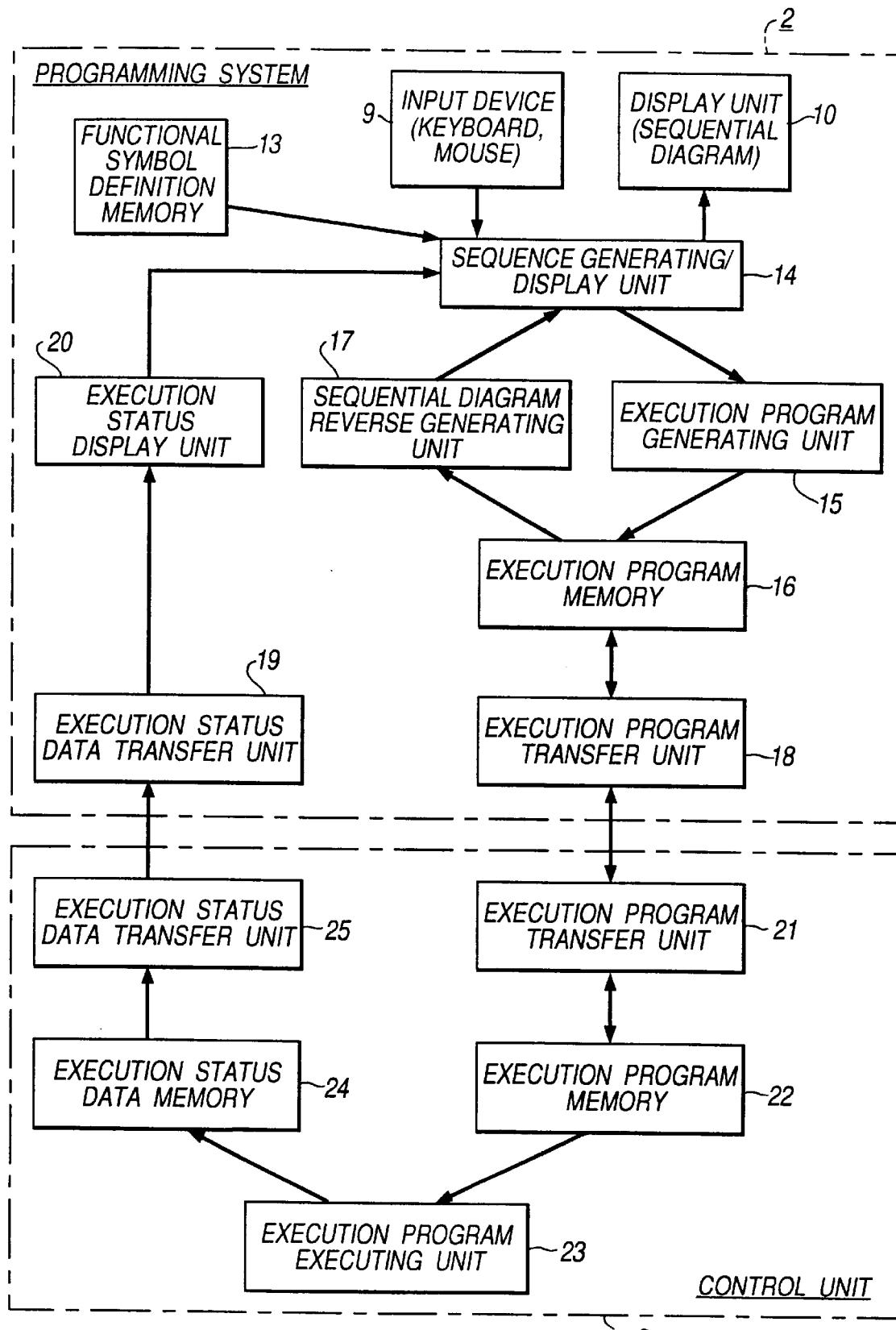
FIG. 1 is a block diagram showing the schematic construction of a programming system and a control unit according to an embodiment of this invention.

Referring now to the drawings, wherein like reference numerals designate identical or corresponding parts throughout the several views, the embodiments of this invention will be described below.

Figure 2:
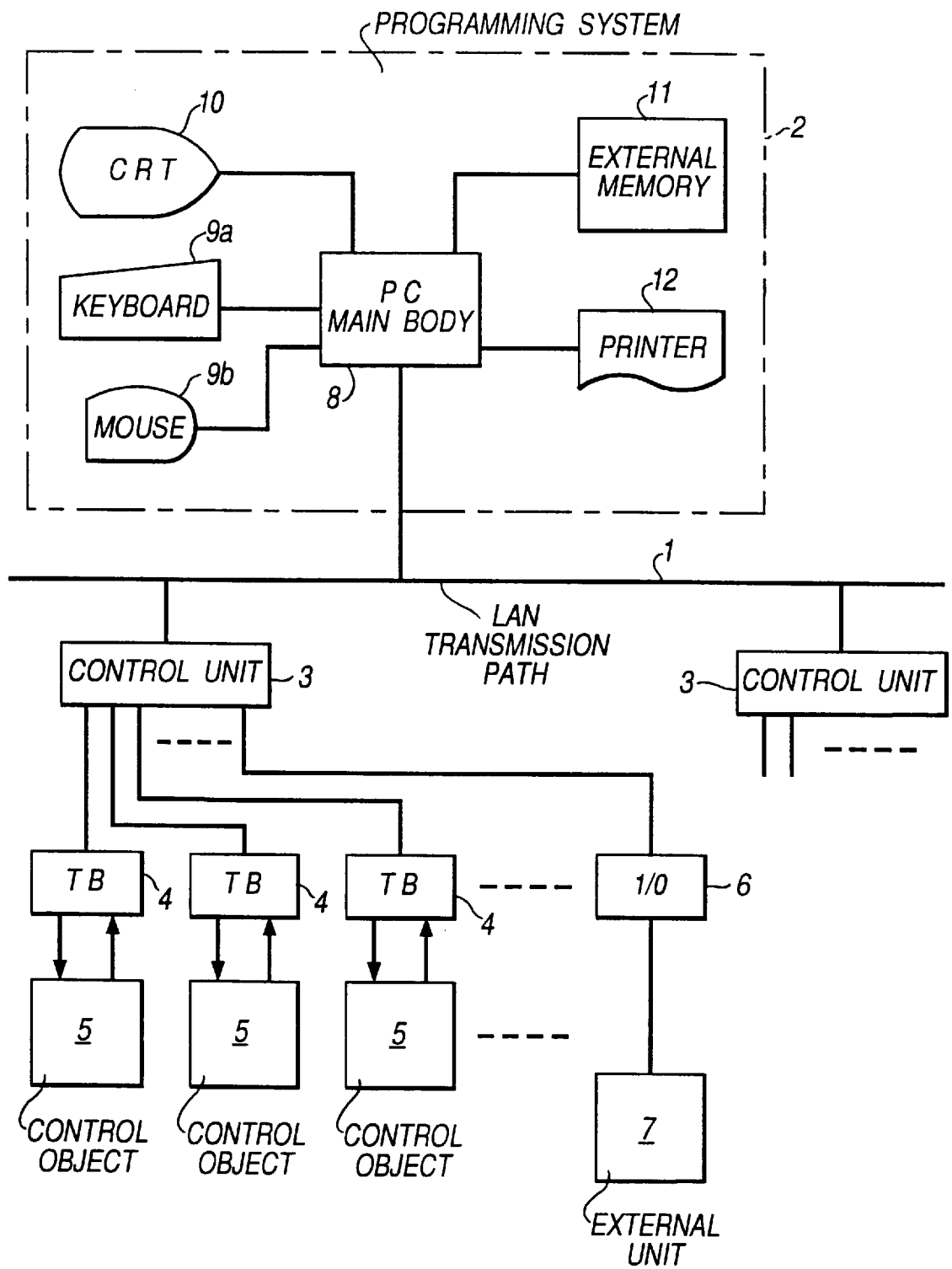
FIG. 2 is a block diagram showing the schematic construction of a process control system composed of the programming system and the control units according to an embodiment of this invention.

FIG. 2 is a hardware block diagram showing the entire process control system incorporating a programming system and a control unit adopting a program execution method according to an embodiment of the present invention.

In FIG. 2, one unit of a programming system 2 and a plurality of control units 3 are connected to a transmission line 1 of a network, for instance, LAN, etc. Various information interchanging can be executed between programming system 2 and each control unit 3 via transmission line 1. Further, Ethernet and RS232C are usable as a transmission means.

Each of control unit 3 composed of a DCS (digital control system) or a PLC (programmable logic controller) is connected to controlled objects 5 such as various equipments via terminal boards (TB) 4, respectively. In addition, external equipment 7 is connected to each control unit 3 via an I/O card 6. Control unit 3 monitors and controls the operations of controlled objects 5 by executing an execution program received from programming system 2.

On programming system 2 including an information processor, such as a computer, etc., a keyboard 9a and a mouse 9b as an input device, a CRT display 10 as a program generating screen, an external memory 11 composed of an HDD (a hard disk drive), etc., for instance, for storing a functional symbol definition memory and generated execution programs, etc., a printer 12 to print out generated sequential diagrams and execution programs when needed, etc. are connected to a PC (personal computer) main body 8.

FIG. 1 is a block diagram showing a plurality of processing units formed as a software on application programs in programming system 2 and control unit 3.

That is, programming system 2 includes of an input device 9 composed of keyboard 9a and mouse 9b, CRT display 10, a functional symbol definition memory 13, a sequence generating/display unit and an execution program generating unit 15 formed in external memory 11, and further an execution program memory 16, a sequential diagram reverse generating unit 17, an execution program transfer unit 18, an execution status data transfer unit 19 and an execution status display unit 20 formed in external memory 11.

On the other hand, each control unit 3 is composed of an execution program transfer unit 21, an execution program memory 22, an execution program executing unit 23, an execution status data memory 24 and an execution status data transfer unit 25.

In functional symbol definition memory 13 of programming system 2, name and function of applicable functional symbol 26 are defined for each of plural kinds of functional symbols 26 defining each step in the sequence representing a control procedure (a specification) for control objects as shown in FIGS. 3a, 3b and 4. In this embodiment, thirteen kinds of independent functional symbols 26 are defined.

Figure 15A:
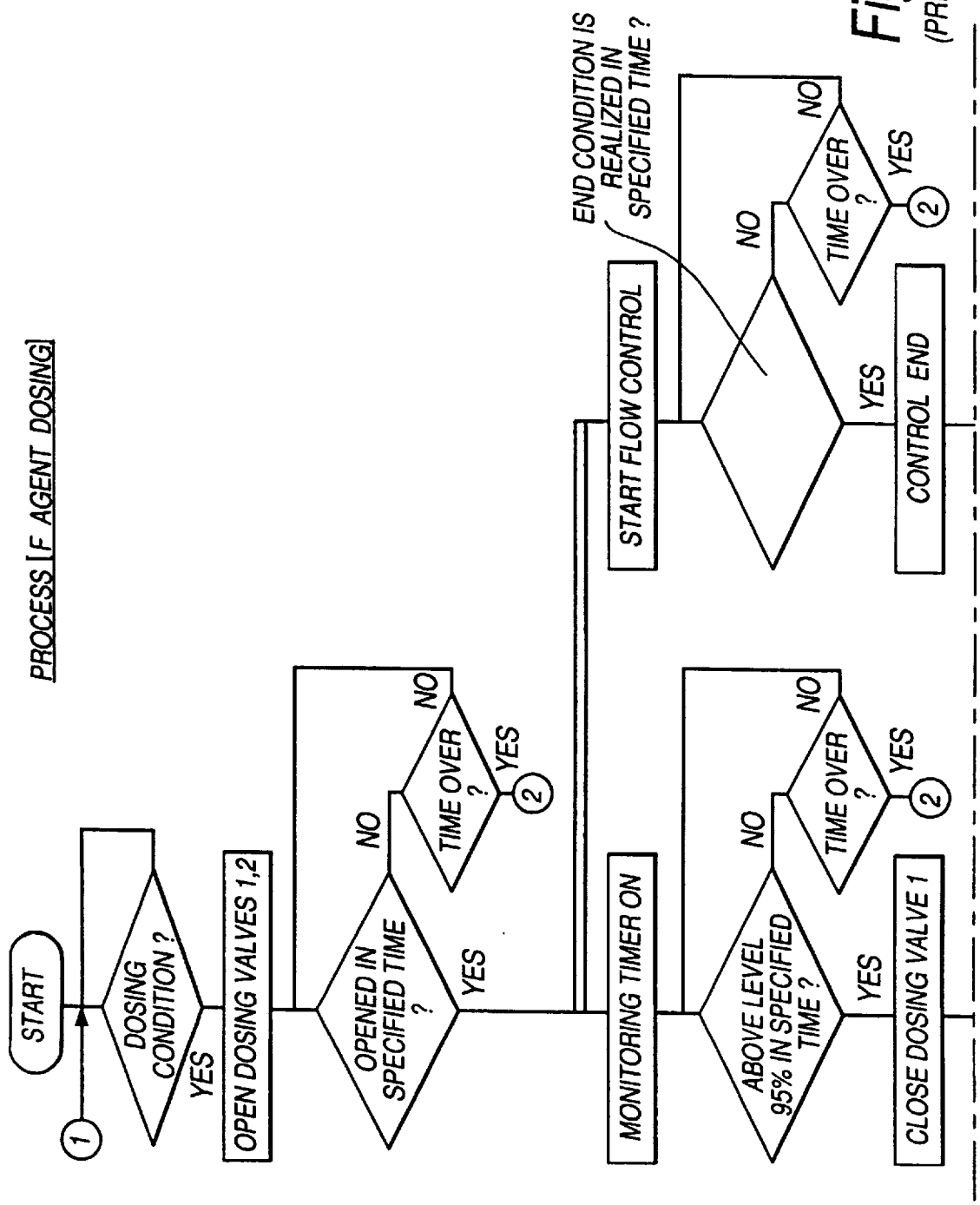
FIG. 15 is a diagram showing a general conventional flowchart type program.
Figure 15B:
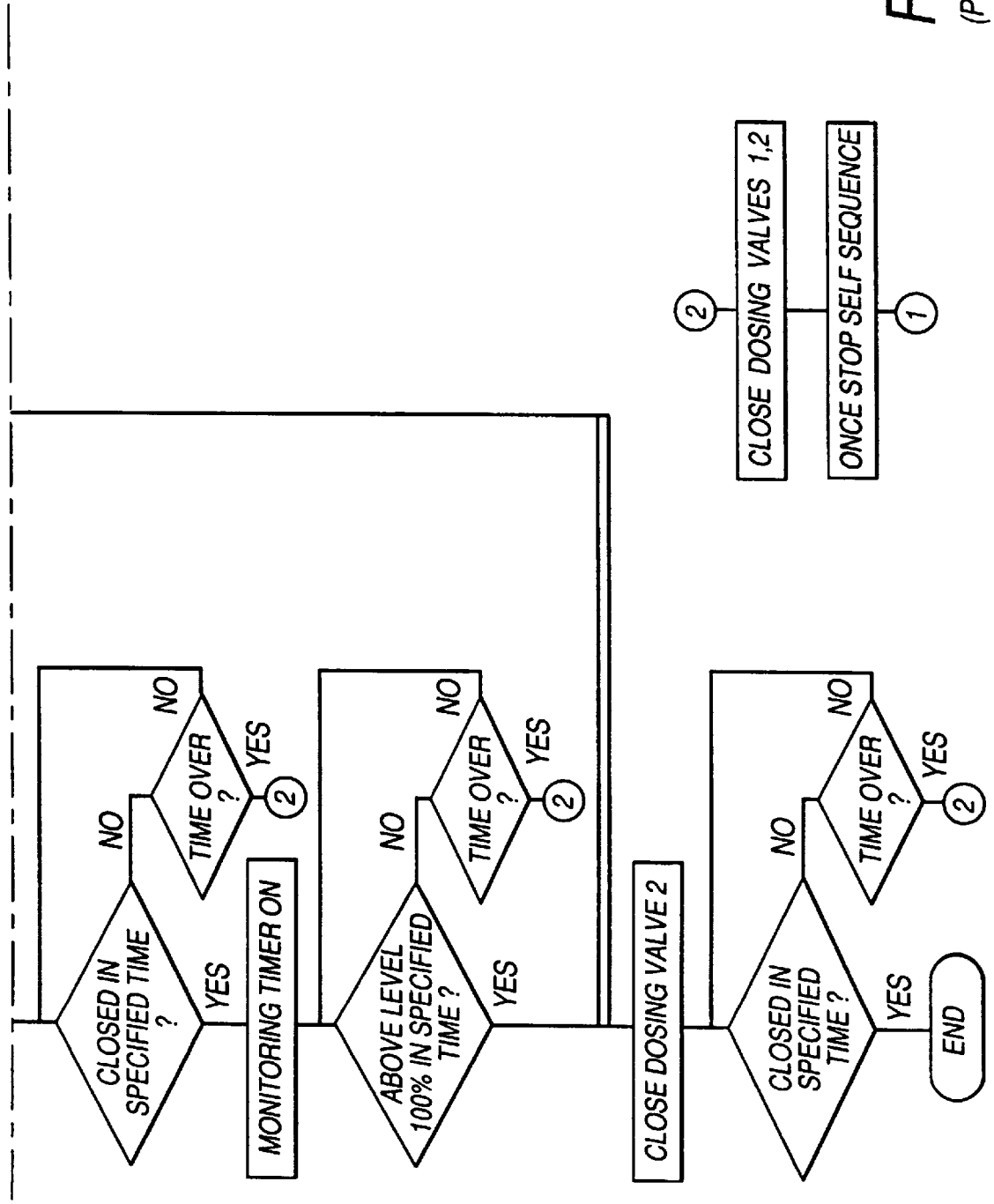
Figure 16:
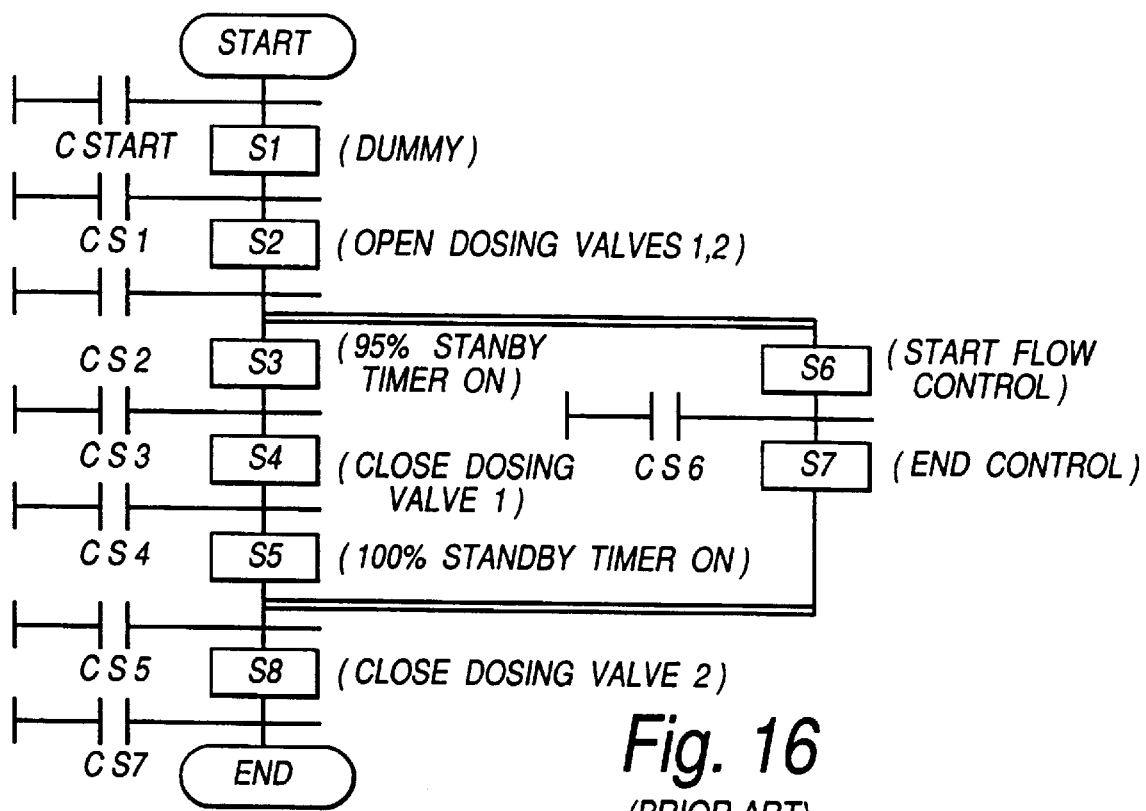
FIG. 16 is a diagram showing a general conventional SFC type program.
Figure 17:
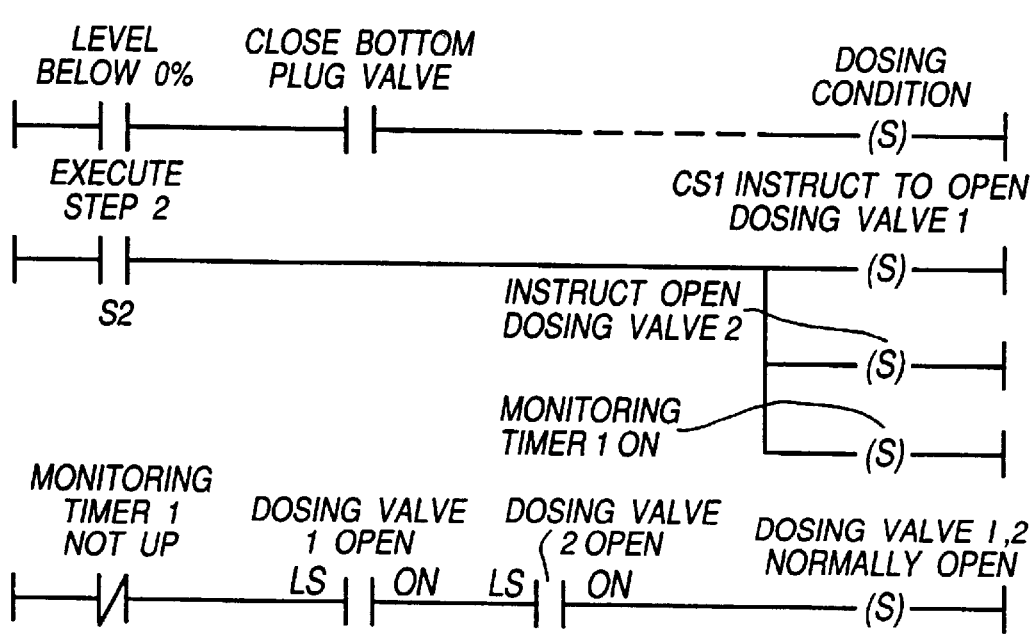
FIG. 17 is a diagram showing a detailed conventional SFC type program.

In this case, the describability of the specification is determined depending on what steps in the sequence are defined as functional symbols 26. That is, as presented in the flowchart type program shown in FIG. 15, it is clear that such basic symbols shown in the flowchart as START, END, Process and Branch only are insufficient for the describability of the specification. On the other hand, if there are too many kinds of functional symbols 26 to be defined, a confusion may result. Accordingly, in this embodiment, thirteen kinds of functional symbols 26 are defined that are sufficient for describing typical processes frequently appearing in the sequential control in the process control system as one steps, respectively.

Thirteen kinds of functional symbols 26 are displayed at the central position of a program generating screen 10a on CRT display 10 as shown in FIG. 5, when generating the sequential diagram. Further, four kinds of connection symbols showing such as moving directions, parallel processing and the like are displayed at the central position in addition to thirteen kinds of functional symbols 26.

In FIG. 5, this program generating screen 10a is composed of an editing area 27a for generating a sequential diagram that is divided into 60 divided areas of 6 rows and 10 lines and a process contents display area 27b that displays definite names and definite process contents 29 of functional symbols 26 in the text format for each Step Number.

Next, the structure of a sequence table 30 formed in sequence generating/display unit will be explained using FIG. 6.

Figure 6:
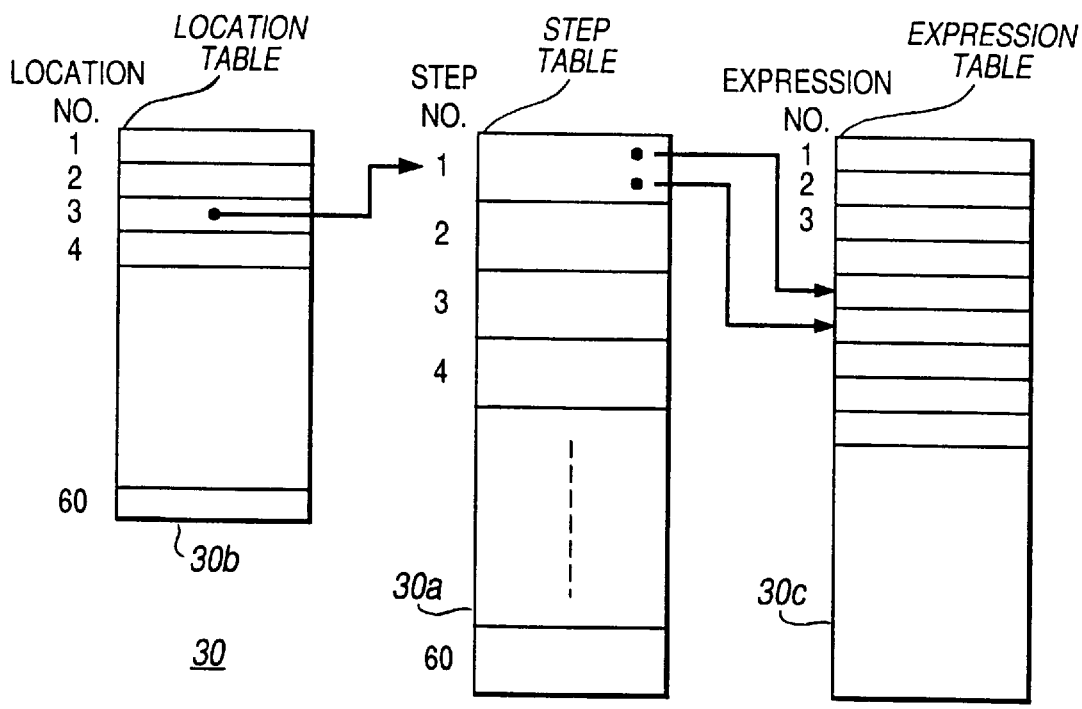
FIG. 6 is a diagram showing the construction of a sequence table formed in a sequence generating/display unit of the programming system according to an embodiment of this invention.

This sequence table 30 is composed of a step table 30a, a location table 30b and an expression table 30c as illustrated in FIG. 6.

Step Table 30a has plural areas corresponding to respective Step Numbers in the sequential diagram generated on program generating screen 10a. In each area of step table 30a, parameters for executing each Step, for instance, a timer set value and a name showing the contents of functional symbol assigned to applicable step are written. Definitely, a new functional symbol 26 that is set by a programmer on program generating screen 10a is stored in the smallest numbered area out of empty areas. This position becomes Step Number (1–60) in step table 30a to discriminate functional symbol 26.

In Location Table 30b, the relationship between Location No. (1–60), corresponding to one of 60 divided areas on editing area 27a, showing the drawing position of functional symbol 26 and step No. (1–60) is written.

Further, in Expression Table 30c, a conditional expression and an operating expression showing the definite processing content of functional symbol 26 defined by Step No. of Step Table 30a are written. To each storage position, Expression No. is assigned and serves as a pointer to show the relationship with Step No. in Step Table 30a.

Sequence table 30 composed of Step Table 30a, Location Table 30b and Expression Table 30c is updated whenever the editing, that is, drawing, deletion, copying, pasting is performed while maintaining their mutual relationship.

When the programmer starts the programming process on programming system 2 in such the structure, sequence generating/display unit reads functional symbols 26 stored in functional symbol definition memory 13 and displays them at the center on program generating screen 10a of CRT display 10 as shown in FIG. 5.

Then, when the programmer moves one functional symbol 26 or one connection symbol displayed to a rectangular area 28 designated by a drag cursor, that functional symbol 26 or connection symbol is displayed on the applicable position in rectangular area 28. Next, when the programmer inputs a definite name, for example, "Initialization" of applicable functional symbol 26 and the definite processing contents in applicable functional symbol 26 using keyboard 9*a*, the name, for example, "Initialization" and the processing contents in this functional symbol 26 are displayed in process contents display area 27*b*. At the same time, the name, for example, "Initialization" of applicable functional symbol 26 is registered on Step Table 30*a* and the process contents in this functional symbol 26 are registered on Expression Table 30*c*. Furthermore, the positional information, that is, one of 60 divided areas of applicable functional symbol 26 is registered on Location Table 30*b*.

Figure 8:
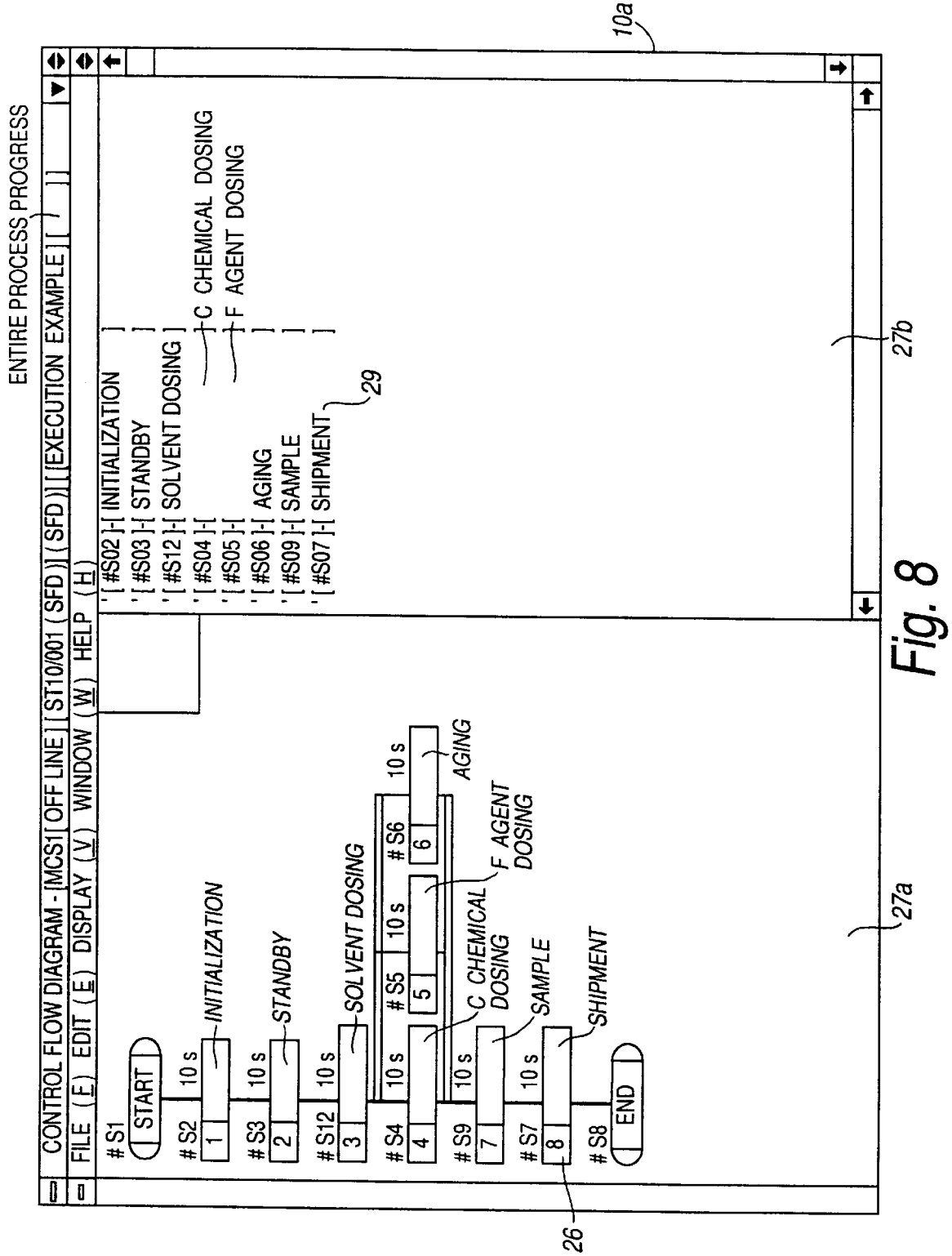
FIG. 8 is a diagram showing one sequential diagram produced on the program generating screen of the programming system according to an embodiment of this invention.
Figure 9:
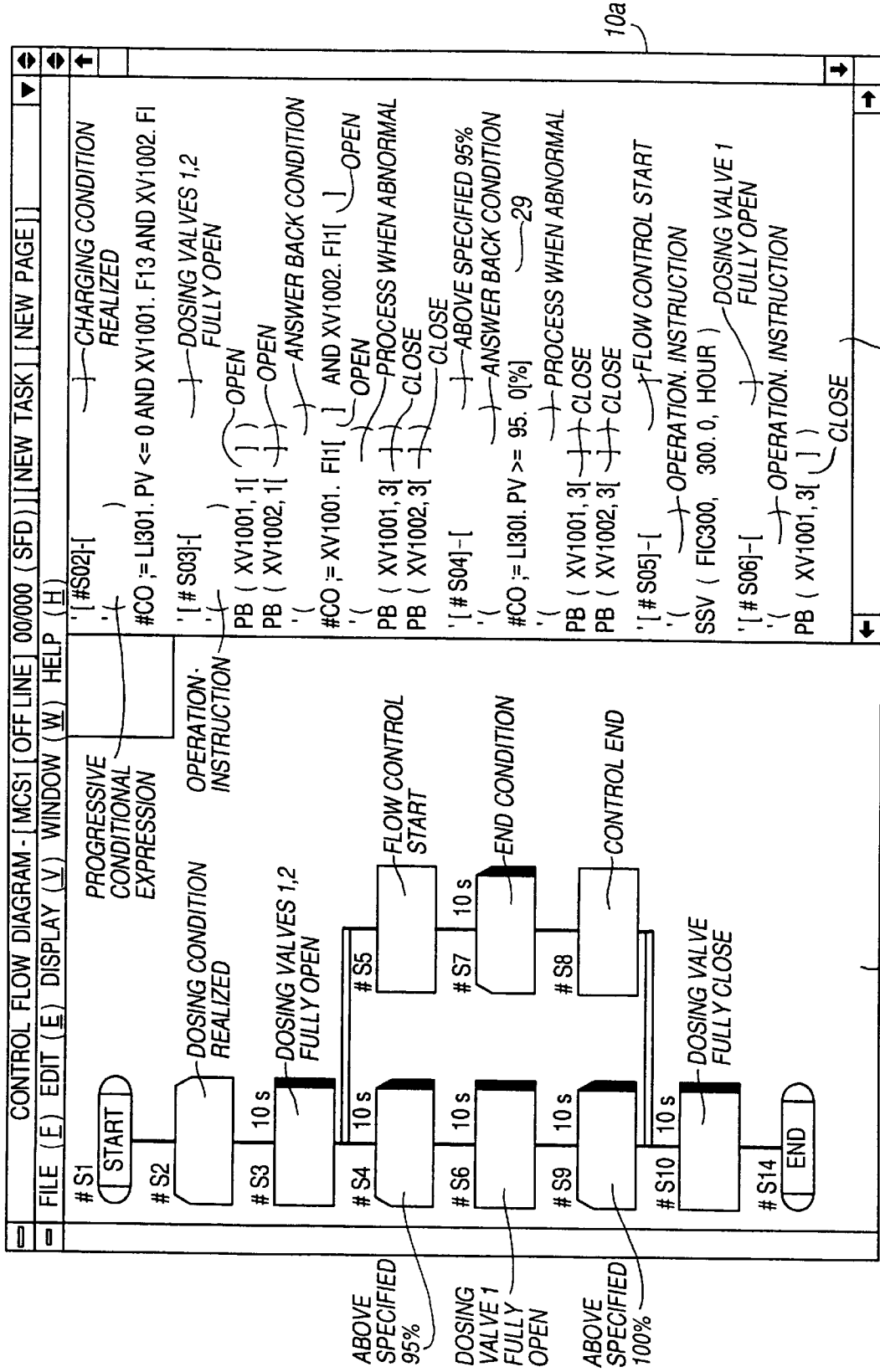
FIG. 9 is a diagram showing another sequential diagram produced on the program generating screen of the programming system according to an embodiment of this invention.

Thus, corresponding to the designation and the input operation of the process contents of functional symbol 26 by the programmer, one of sequential diagram shown in FIG. 8 and FIG. 9 is drawn on program generating screen 10*a*, and at the same time, the definite process content of applicable functional symbol 26 is written for each Step No. on Sequence table 30 shown in FIG. 6.

When completing the drawing process of one sequential diagram on program generating screen 10*a*, the programmer starts execution program generating unit 15.

Execution program generating unit 15 compiles a sequential diagram generated by sequence generating/display unit 14 into an execution program (an object program) that is comprehensible to control unit 3.

Figure 7:
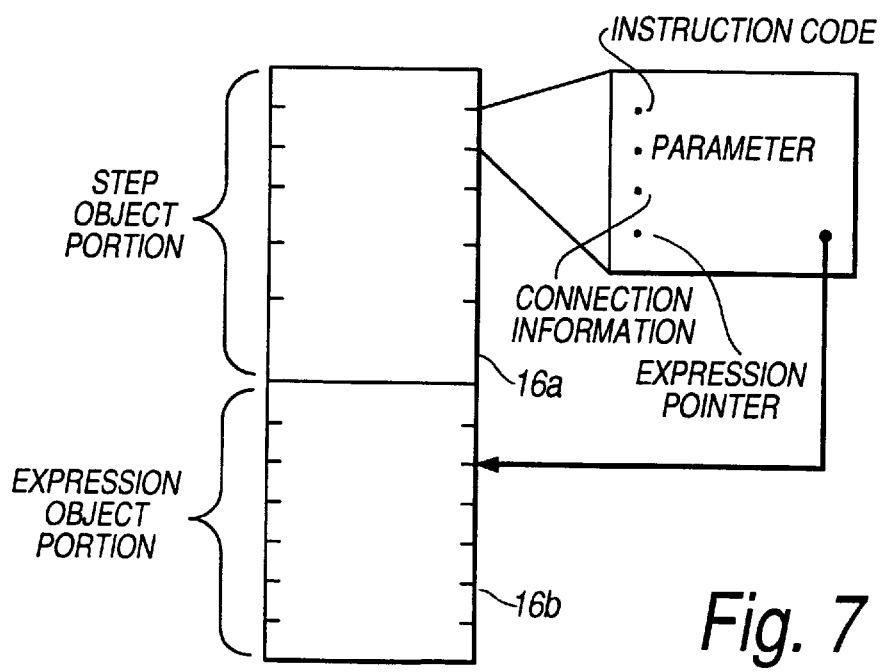
FIG. 7 is a diagram showing the construction of an execution program generated by a program generating unit of the programming system according to an embodiment of this invention.

That is, the execution program (the object program) generated by execution program generating unit 15 is composed of a step object portion 16*a* and an expression object portion 16*b* as shown in FIG. 7. That is, the program for sequence control is compiled separately in step object portion 16*a* with the structure having instruction word length, drawing position and connection information comprehensible to control unit 3 for each kind of functional symbols 26 that are set for applicable Step No. and expression object portion 16*b* with the structure having instruction word length, drawing position and connection information of the conditional expression and the operational expression stored in expression table 30*c* comprehensible to control unit 3.

As a result, step object portion 16*a* contains pointer information of relating expression object portion 16*b*.

Execution program generating unit 15 writes the generated execution program composed of step object portion 16*a* and expression object portion 16*b* shown in FIG. 7 into execution program memory 16.

Then, when the programmer inputs a program transfer instruction, execution program transfer unit 18 starts up and transmits the previously generated execution program stored in execution program memory 16 to control unit 3 via transmission path 1.

Further, when the programmer inputs a sequential diagram reverse generating instruction, sequential diagram reverse generating unit 17 starts up and reads the execution program composed of step object portion 16*a* and expression object portion 16*b* once written in execution program memory 16, and further reversely generates the sequential diagram and displays it on program generating screen 10*a* via sequence generating/display unit.

Further, in general it is extremely difficult to simply reproduce a source program from an object program. However, in this embodiment, as the drawing position of functional symbol 26 and information on mutual connections between functional symbols 26 are stored in step object portion 16*a* separately from the actual process content of functional symbols 26 stored in expression object portion 16*b* in the course of generating the execution program from the program for sequence control as shown in FIG. 7, the sequential diagram, that is the specification, can be reproduced simply and certainly from the execution program.

FIG. 8 is a sequential diagram showing the entire construction of the control specification for control objects generated by sequence generating/display unit on program generating screen 10*a*. As illustrated here, names of process contents of functional symbols 26 assigned to applicable steps are displayed in the right side process content display area 27*b*, respectively.

Further, FIG. 9 is a sequential diagram showing the detailed process of individual Step No. 5 [F Agent Dosing] in the sequential diagram showing the entire construction shown in FIG. 8. As illustrated here, the detailed process contents of execution condition, abnormality process, etc. of functional symbols 26 assigned to applicable steps are displayed in the text format in the right side process contents display area 27*b*, respectively.

Next, the operations of the each unit in control unit 3 will be explained.

Execution program transfer unit 21 once stores the execution program composed of step object portion 16*a* and expression object portion 16*b* received from programming system 2 in execution program memory 22.

Execution program executing unit 23 reads out and executes the execution program stored in execution program memory 22.

Figure 10:
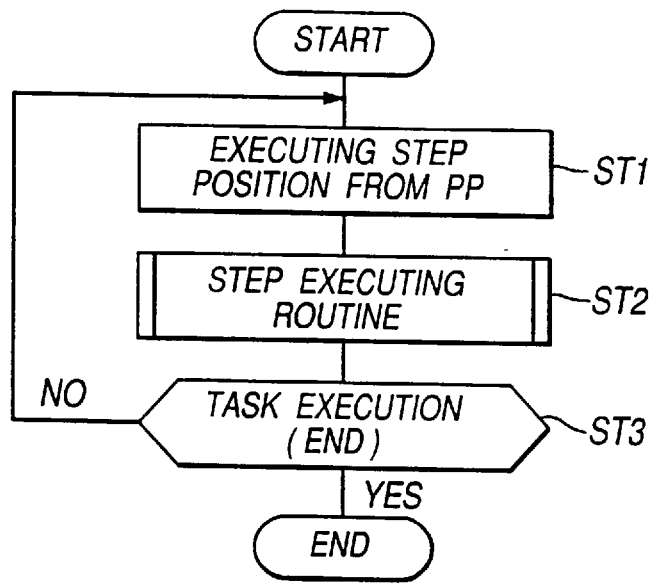
FIG. 10 is a flowchart showing the processing procedure of an execution program of the control unit according to an embodiment of this invention.

FIG. 10 shows the movement of an interpreter of this execution program executing unit 23 for the basic one task execution. That is, the execution of a task is handed over to the interpreter, a step position is taken out of a program counter (hereinafter referred to as PP) in a step ST1 and an applicable step executive routine of the execution program (the object program) is executed at a step ST2.

In this step executive routine at step ST2, when a process is executed differently for each instruction word, the next jumping destination is set at PP and the operation returns to step ST1. At this time, the interpreter is informed of whether the process is (Continuous Execution) within the task or (End) of the process within the task at step ST3.

If informed of the continuous execution, the interpreter further takes out a step position from PP at step ST1 and executes the process without switching a task. Further, if informed of the end of process, the interpreter does not further execute the process of applicable task and switching to the next task, executes the similar process.

Figure 11:
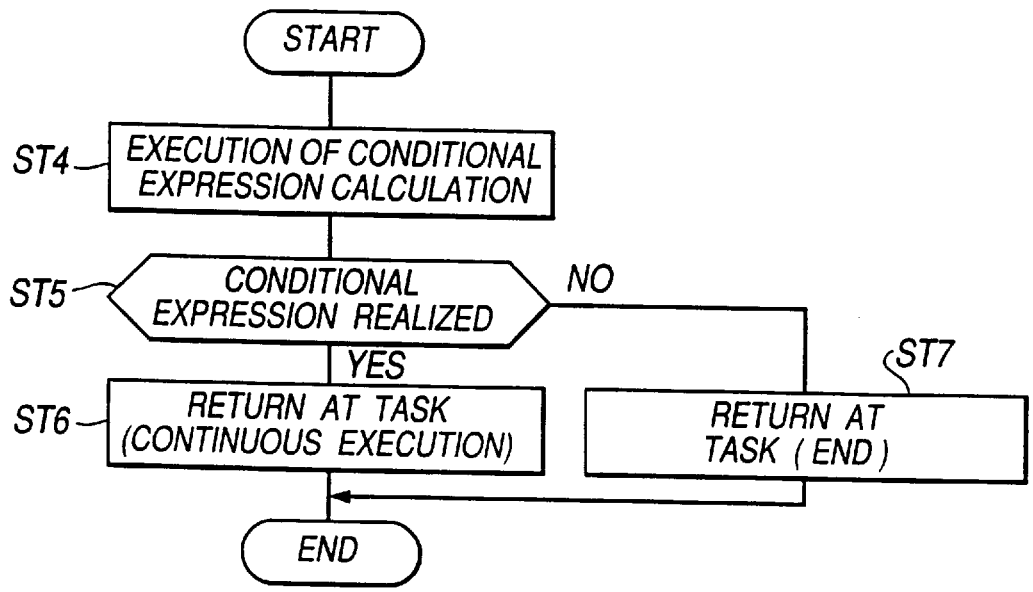
FIG. 11 is a flowchart showing the processing procedure of an execution program of the control unit according to an embodiment of this invention.

As a simple example of the step execution routine in step ST2 described above, a conditional branching step is shown in FIG. 11. That is, in this conditional branching step, the conditional expression defined in expression object portion 16*b* shown in FIG. 7 is executed at a step ST4, and if the conditional expression is true at a step ST5 the process is shifted to a following step ST6. Further, if the conditional expression is not true at step ST5 the process is shifted to a step ST7.

Thus, in the step execution routine in the conditional branching step, at step ST6 the process returns to the task for (Continuous Execution) by setting the next jumping destination at PP if the conditional expression is true. If the conditional expression is not true, at step ST7 the process returns to the task for (End) by setting the next jumping destination at PP. Accordingly, even in a sequence, for instance, in which conditional branching steps are connected at multiple stages, the process can progress within one execution process cycle in the case where conditions are true.

That is, in control unit 3 in this embodiment, the process where conditions are true in the direction of progress shown in the sequential diagram is executed in one execution cycle. As a result, even in a sequential diagram in which multiple conditional branches continue, the process does not extend over multiple cycles like a conventional SFC type program. Therefore, the operation faithfully corresponding to the specification described in the sequential diagram is achieved.

Next, the operations of execution status data memory 24 and execution status data transfer unit 25 to detect the execution status of the execution program will be explained.

As described above, in control unit 3 the program counter (PP) that is set by the step execution routine in execution program executing unit 23 shows the step position under the execution. This step position is detected as the execution status data and is written in execution status data memory 24. Then, in response to a request for transmission from programming system 2, the detected execution status data is transferred to execution status data transfer unit 25.

Then, upon receipt of the execution status data from control unit 3, execution status data transfer unit 19 of programming system 2 transfers the received execution status data to execution status display unit 20.

Figure 12:
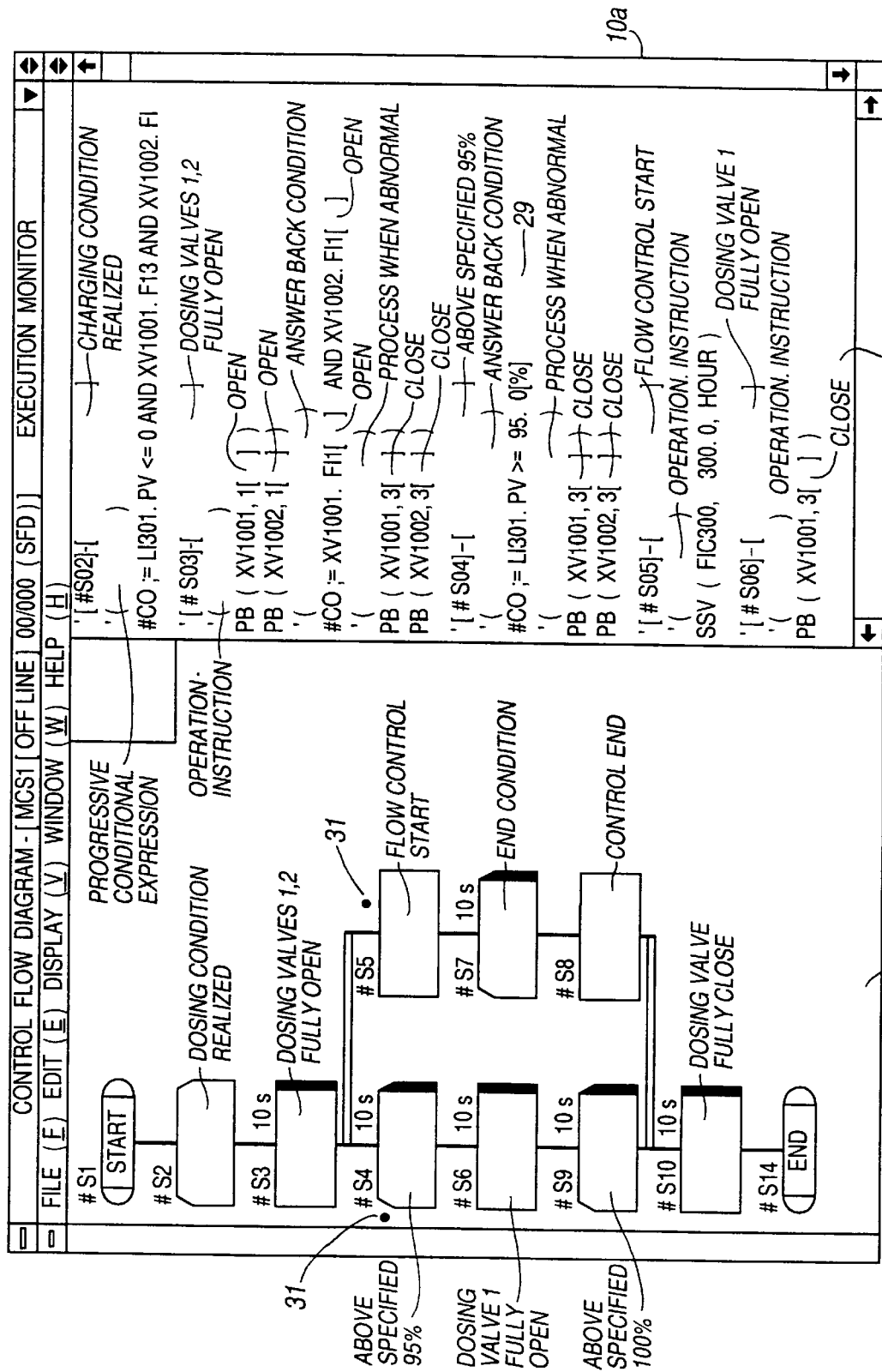
FIG. 12 is a diagram showing a sequential diagram with the execution status of the execution program displayed on the program generating screen of the programming system according to an embodiment of this invention.

Execution status display unit 20 receives the execution status data and converts execution step position included in the execution status data into a drawing position and then, displays the applicable position on the sequential diagram corresponding to applicable execution program by a mark 31 as shown in FIG. 12 through sequential diagram generating/display unit 14.

Accordingly, it is possible for the programmer to monitor in realtime the execution status of the sequential program currently under execution by control unit 3 on program generating screen 10*a*.

In the process control system constructed as described above, only when a programmer draws a sequential diagram using thirteen kinds of functional symbols 26 defined in functional symbol definition memory 13 on program generating screen 10*a* in such a manner as to generate a control specification for control objects 5, and at the same time inputs the respective process contents 29 of functional symbols 26 for each Step No. in the text format, an execution program composed of step object portion 15*a* and expression object portion 15*b* that is comprehensible to control unit 3 is automatically generated.

So, when it is required that the control specification for controlled objects 5 is changed, it is only needed to modify the sequential diagram on program generating screen 10*a* and change the process contents of functional symbol 26 at the modified point.

Figure 13:
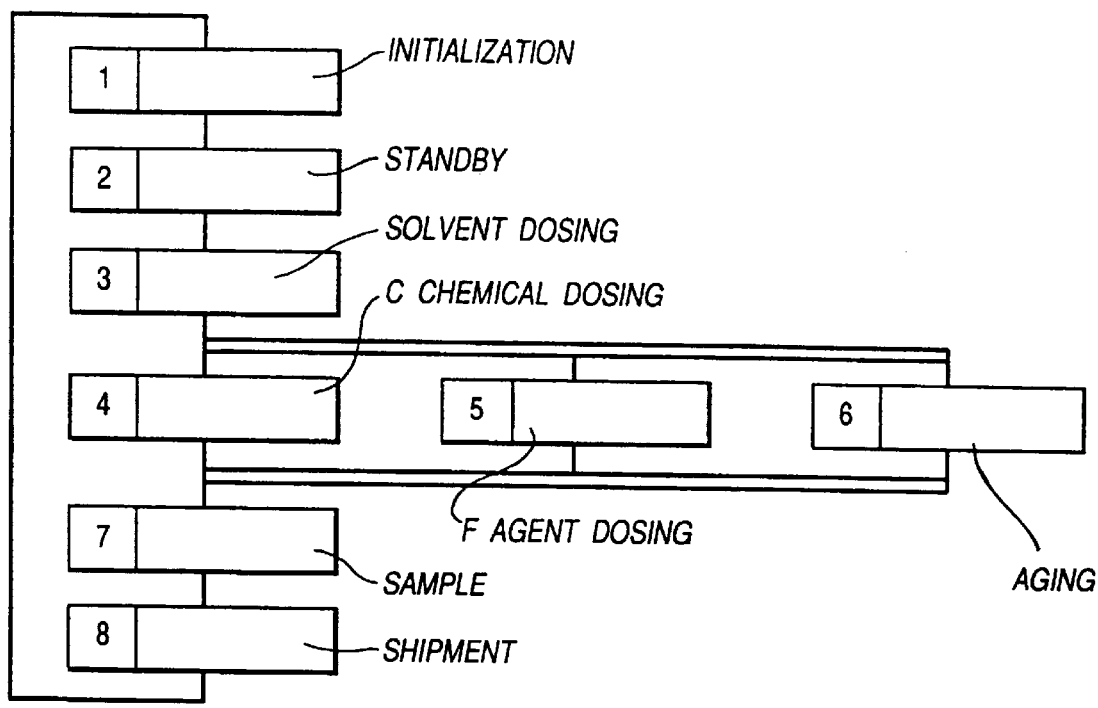
FIG. 13 is a conventional sequential diagram.
Figure 18:
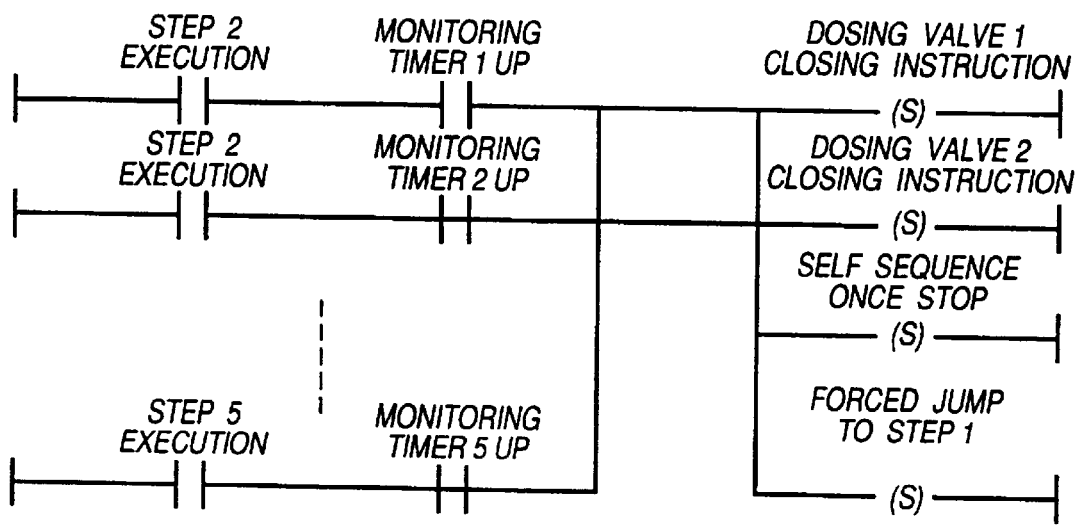
FIG. 18 is a diagram showing a detailed conventional SFC type program.
Figure 14:
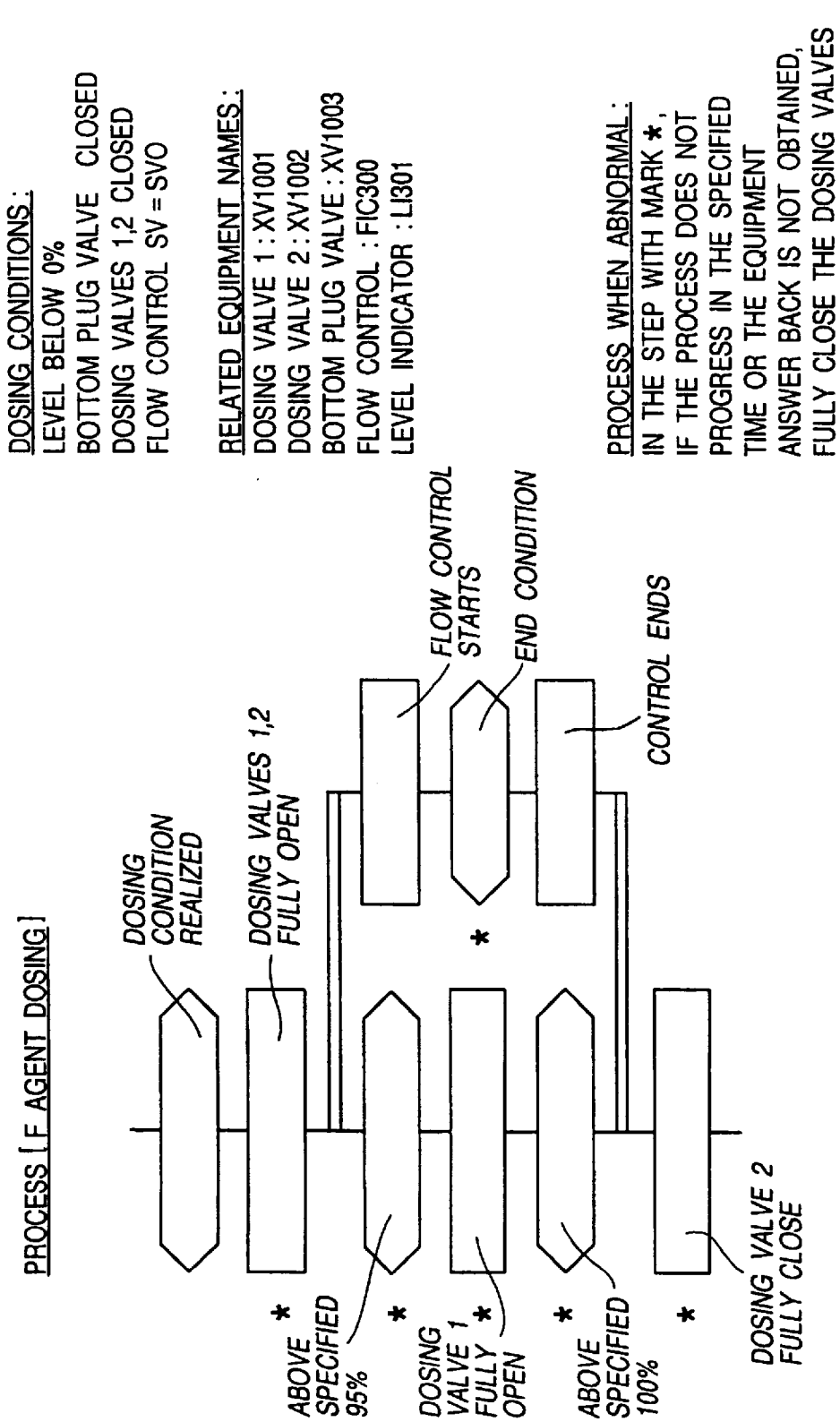
FIG. 14 is a detailed conventional sequential diagram.

Therefore, when changing a control specification for controlled objects in this embodiment, it is not necessary to make a correction while adjusting a sequential diagram shown in FIG. 13, that is equivalent to "Specification" and a flowchart type program or an SFC type program, that is equivalent to "Program" as in a conventional technique.

That is, a unified management of a program becomes possible and thus, efficiency of program change work associated with specification change is sharply improved. Furthermore, reliability of the specification change work can be improved, as artificial error generating probability decreases.

Further, in the sequential diagrams shown in FIGS. 8 and 9, the entire process and the individual processes can be separately described, and therefore, these sequential diagrams are excellent in describing specifications. In addition, as it is possible to describe names in the sequential diagrams directly indicating functions of respective functional symbols 26, they are also sufficiently acceptable even when used as specifications.

In addition, in functional symbols 26 are defined functional symbol definition memory 13 shown in FIGS. 3*a*, 3*b* and 4. It is so considered that the answer back process and the timer waiting process that are often used in the process of sequential control can be described by a single functional symbol. So, if the sequential diagram is written using only these functional symbols 26, productivity and quality are improved without lowering the describability of a specification as in a conventional flowchart type program shown in FIG. 15.

Furthermore, the way of drawing shown in FIG. 5 promotes productivity more than a free CAD drawing in that the drawing for each element is specified. Further, in a system to arrange lines and symbols freely, an individual difference rather appears and it becomes difficult to arrive at the same quality.

Further, as an execution program includes step object portion 15*a* and expression object portion 15*b*, it is possible to simply reproduce a sequential diagram that is a high level source program reversely from an execution program that is an object program. Therefore, the programmer is able to make a program modification and monitor the execution status based on the reverse generated sequential diagram.

In addition, the programmer is also able to monitor the execution status of the execution program being executed by control unit 3 on program generating screen 10*a* of programming system 2.

In this embodiment, CRT display 10 is used as the program generating screen. But this invention is not limited to this embodiment. Liquid crystal display can be used instead of CRT display 10.

Furthermore, a program to embody a programming system for sequence control according to this invention can be stored in a medium, such as various memory devices.

As described above, in the programming system for sequence control, the process control system, the programming tool for sequence control, the programming method for sequence control and the program storing medium for sequence control according to present invention, functional symbols are respectively, defined by each function for steps having different functions in the sequence. Therefore, a sequential diagram that is produced as "Specification" can be input almost as it is, and it is possible to automatically generate and transfer an execution program to the control unit, manage both a specification and a program consolidatedly, sharply reduce volume of program change work associated with the specification change and improve efficiency in program generation and change works. Further, it is possible to generate an execution program executable by a control unit with high describability and readability for a program specification.

Further, it is possible to simply generate a sequential diagram reversely, that is a high level source program from an execution program which is an object program.

In addition, in the control unit and the process control system of the present invention, it is possible to receive an execution program from the programming system, execute the execution program, transfer the program execution status to the programming system and display for monitoring.

Furthermore, in the program execution method of the present invention, even when multiple conditional branches continue in a sequential diagram, the course where conditions are true is executed in one execution cycle without restriction as in SFC program in which only one step is progressed in one execution cycle. Accordingly, the operation faithfully corresponding to a specification is carried out.

Obviously, numerous modifications and variations of the present invention are possible in light of the above teachings. It is therefore to be understood that within the scope of the appended claims, the invention may be practiced otherwise than as specifically described herein.

What is claimed is:

1. A programming system for sequence control, comprising:

display means;

functional symbol definition memory means for storing a plurality kinds of functional symbols, each for defining one of a plurality of steps in a sequence showing control procedure for a control object controlled by a control unit, respectively;

sequential diagram generating and display means including sequence table means;

input means for inputting in order a plurality of said functional symbols along with process contents in a text style to be executed in said functional symbols, respectively, into said sequential diagram generating and display means;

said sequential diagram generating and display means displaying a plurality of said functional symbols along with said process contents inputted by said input means as a sequential diagram on a program generating screen of said display means and storing a plurality of said process contents inputted by said input means for each of said steps in said sequence table means;

execution program generating means for generating an execution program that is executable by said control unit for said sequential diagram based on the memory contents of said functional symbol definition memory means and said sequence table means;

execution program transfer means for transferring said execution program to said control unit;

sequential diagram reverse generating means for reversely generating said sequential diagram from said execution program; and reversely generated sequential diagram display means for displaying said sequential diagram generated by said sequential diagram reverse generating means on said program generating screen.

2. The programming system for sequence control according to claim 1, further comprising:

execution program execution status receiving means for receiving from said control unit an execution status of said execution program in said control unit; and execution program execution status display means for displaying said execution status of said execution program from said execution program execution status receiving means on said sequential diagram corresponding to said execution program displayed on said program generating screen.

3. The programming system for sequence control according to claim 2, wherein said execution program includes:

a step object portion with instruction word length, drawing position and connection information of each of said functional symbols which are comprehensible to said control unit; and an expression object portion with instruction word length, drawing position and connection information of each of conditional expressions and operational expression of said process contents which are comprehensible to said control unit.

4. The programming system as claimed in claim 1, further comprising:

execution program receiving means for receiving an execution program transferred from said execution program transfer means to control the control object;

execution program execution means for executing said execution program to said control object; and execution program execution status transfer means for detecting an execution status of said execution program in said control object and for transferring said execution status of said execution program to said programming system.

5. A process control system, comprising:

a programming system for sequence control for generating an execution program to control a control object; and a control unit for controlling said control object by said execution program;

said programming system for sequence control, including,
   display means, functional symbol definition memory means for storing a plurality kinds of functional symbols, each for defining one of a plurality of steps in a sequence showing control procedure for said control object controlled by said control unit, respectively, sequential diagram generating and display means including sequence table means, input means for inputting in order a plurality of said functional symbols along with process contents in a text style to be executed in said functional symbols, respectively, into said sequential diagram generating and display means, said sequential diagram generating and display means displaying a plurality of said functional symbols along with said process contents inputted by said input means as a sequential diagram on a program generating screen of said display means and storing a plurality of said process contents inputted by said input means for each of said steps in said sequence table means, execution program generating means for generating an execution program that is executable by said control unit for said sequential diagram based on the memory contents of said functional symbol definition memory means and said sequence table means, execution program transfer means for transferring said execution program to said control unit, sequential diagram reverse generating means for reversely generating said sequential diagram from said execution program, and reversely generated sequential diagram display means for displaying said sequential diagram generated by said sequential diagram reverse generating means on said program generating screen;

said control unit for controlling said control object, including:

execution program receiving means for receiving said execution program transferred from said programming system to control said control object, execution program execution means for executing said execution program to said control object, and execution program execution status transfer means for detecting an execution status of said execution program in said control object and for transferring said execution status of said execution program to said programming system; and said programming system for sequence control, further including, execution program execution status receiving means for receiving from said control unit said execution status of said execution program in said control unit, and execution program execution status display means for displaying said execution status of said execution program from said execution program execution status receiving means on said sequential diagram corresponding to said execution program displayed on said program generating screen.

6. A program execution method for executing an execution program, the method comprising the steps of:

storing in a programming system a plurality of kinds of functional symbols, each symbol for defining one of a plurality of steps in a sequence showing control procedure for a controlled object controlled by a control unit;

inputting, in order into a sequential diagram generating and display means including a sequence table means, a plurality of said functional symbols and process contents in a text style to be executed;

displaying a plurality of said functional symbols along with said process contents, inputted in said inputting step, as a sequential diagram on a program generating screen of said display means;

storing a plurality of said process contents inputted in said inputting step for each step in said sequence table means, generating an execution program that is executable by said control unit based on a memory contents of said functional symbols input in said inputting step into said sequence table means, to control the controlled object;

transferring said execution program to said control unit, receiving said execution program transferred to control said controlled object, controlling said controlled object by said execution program;

reversely generating said sequential diagram from said execution program, displaying, on said program generating screen, said sequential diagram reversely generated;

detecting an execution status of said execution program in said controlled object;

transferring said execution status of said execution program to said programming system;

receiving from said control unit said execution status of said execution program in said control unit, and displaying said execution status of said execution program on said sequential diagram corresponding to said execution program displayed on said program generating screen;

wherein a plurality of steps in which progress conditions are true simultaneously are executed in one execution cycle by said control unit.

7. A programming tool for sequence control, comprising:

functional symbol definition memory means for storing a plurality kinds of functional symbols, each for defining one of a plurality of steps in a sequence showing control procedure for a control object controlled by a control unit, respectively;

sequential diagram generating and display means including sequence table means;

said sequential diagram generating and display means displaying a plurality of said functional symbols along with said process contents in a text style to be executed in said functional symbols, respectively, inputted in order by input means as a sequential diagram on a program generating screen of display means and storing a plurality of said process contents inputted by said input means for each of said steps in said sequence table means;

execution program generating means for generating an execution program that is executable by said control unit for said sequential diagram based on the memory contents of said functional symbol definition memory means and said sequence table means;

execution program transfer means for transferring said execution program to said control unit;

sequential diagram reverse generating means for reversely generating said sequential diagram from said execution program; and reversely generated sequential diagram display means for displaying said sequential diagram generated by said sequential diagram reverse generating means on said program generating screen.

8. The programming tool for sequence control according to claim 7, further comprising:

execution program execution status receiving means for receiving from said control unit an execution status of said execution program in said control unit; and execution program execution status display means for displaying said execution status of said execution program from said execution program execution status receiving means on said sequential diagram corresponding to said execution program displayed on said program generating screen.

9. A programming method for sequence control, comprising:

storing a plurality kinds of functional symbols in a functional symbol definition memory, each for defining one of a plurality of steps in a sequence showing control procedure for a control object controlled by a control unit, respectively;

inputting in order a plurality of said functional symbols along with process contents in a text style to be executed in said functional symbols, respectively;

displaying a plurality of said functional symbols along with said process contents inputted as a sequential diagram on a program generating screen;

storing a plurality of said process contents inputted for each of said steps in a sequence table;

generating an execution program that is executable by said control unit for said sequential diagram based on the memory contents of said functional symbol definition memory and said sequence table;

transferring said execution program to said control unit;

reversely generating said sequential diagram from said execution program; and displaying said sequential diagram reversely generated on said program generating screen.

10. The programming method for sequence control according to claim 9, further comprising:

receiving from said control unit an execution status of said execution program in said control unit; and displaying said execution status of said execution program on said sequential diagram corresponding to said execution program displayed on said program generating screen.

11. A program storing medium readable by a computer, tangibly embodying a program of instructions executable by said computer to perform method steps for sequence control, said method steps comprising:

storing a plurality kinds of functional symbols in a functional symbol definition memory, each for defining one of a plurality of steps in a sequence showing control procedure for a control object controlled by a control unit, respectively;

inputting in order a plurality of said functional symbols along with process contents in a text style to be executed in said functional symbols, respectively;

displaying a plurality of said functional symbols along with said process contents inputted as a sequential diagram on a program generating screen;

storing a plurality of said process contents inputted for each of said steps in a sequence table;

generating an execution program that is executable by said control unit for said sequential diagram based on the memory contents of said functional symbol definition memory and said sequence table;

transferring said execution program to said control unit;

reversely generating said sequential diagram from said execution program; and displaying said sequential diagram reversely generated on said program generating screen.

12. The program storage medium according to claim 11, further comprising:

receiving from said control unit an execution status of said execution program in said control unit; and displaying said execution status of said execution program on said sequential diagram corresponding to said execution program displayed on said program generating screen.

* * * * *